April 22, 1947.                    E. V. HALL                    2,419,317
           SPRING CLIP FOR SECURING CONDUITS, WIRING AND THE
                         LIKE TO STRUCTURAL PARTS
                         Filed Jan. 16, 1945
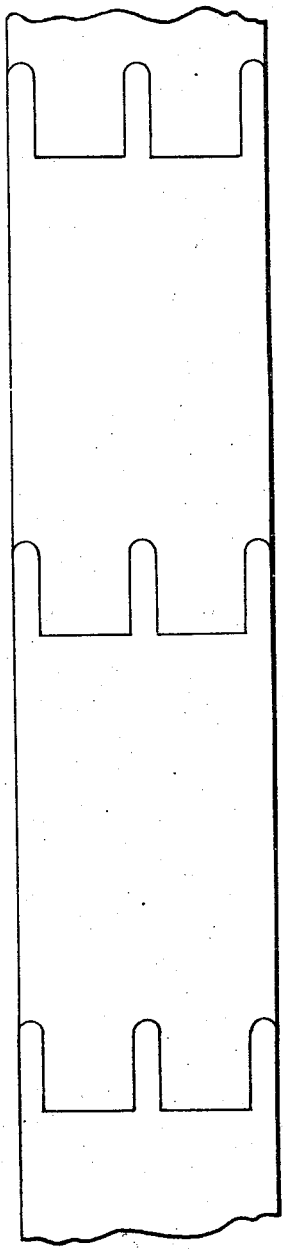
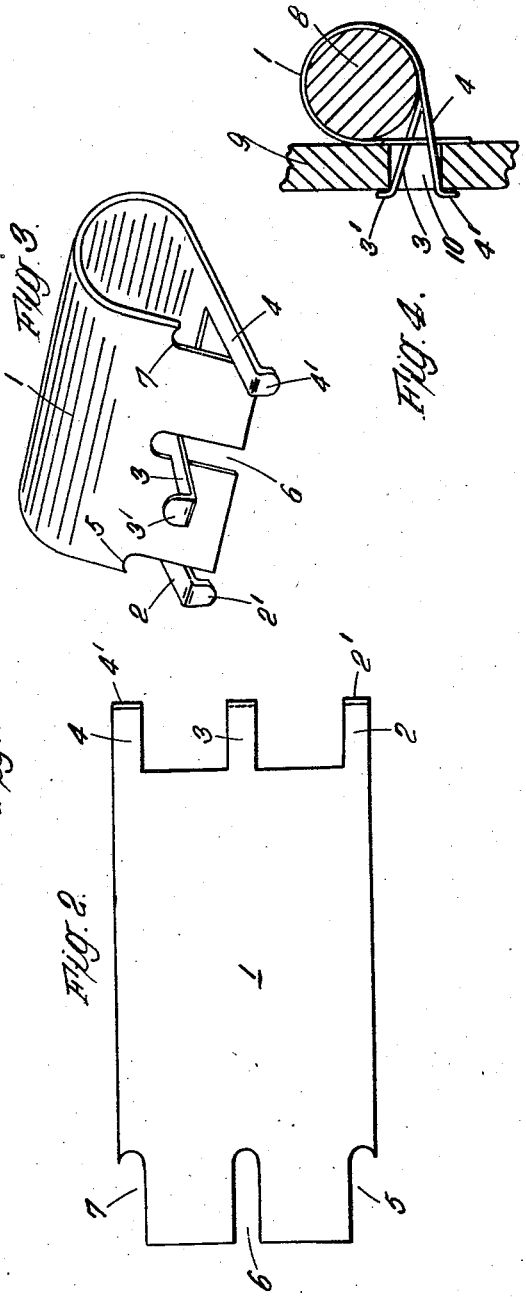
INVENTOR
Eric Vincent Hall
By [signature]
        his ATTY.

Patented Apr. 22, 1947

2,419,317

UNITED STATES PATENT OFFICE 2,419,317

SPRING CLIP FOR SECURING CONDUITS, WIRING, AND THE LIKE TO STRUCTURAL PARTS

Eric Vincent Hall, Hull, England, assignor to Blackburn Aircraft Limited, Brough, England Application January 16, 1945, Serial No. 572,992
In Great Britain January 25, 1944

2 Claims. (Cl. 248—74)

This invention relates to the securing of conduit, electric wiring and the like to structural parts.

At the present time conduits and in particular electric cables and so forth are usually secured to some structural part such as a wall, framework of an aircraft or other such attachment surface by means of a strip of metal placed around the conduit or cable and secured to the supporting surface by means of a nut and bolt, rivet or similar securing device. It is also known to secure electric cables and suchlike by means of a spring clip having a tongue at each end, which tongues engage in a single hole in the attachment surface.

Now the object of the present invention is to provide an improved design of spring clip, for securing conduits, cables and the like to a supporting surface, which may be rapidly positioned and removed yet will firmly hold the conduit or cable at that point.

The clip according to the invention is a one-piece element having at one end a plurality of tongues each terminating in a flange or lip, some of which tongues extend at an angle to another or the others and have their lips turned in the opposite direction, and at the other end recesses or cut-back portions to permit the tongues to extend therethrough when the centre portion is rolled round into tubular form.

The tongues are intended to enter into a slot in the supporting structure or each tongue into a separate hole therein when the resilience of the recessed end, which is tensioned during positioning of the clip, holds their flanges or lips against portions of the opposite surface of the supporting structure towards which they are urged by the relative inclination of the tongues. The clip is thereby firmly held in position and cannot be removed from the supporting structure without flexing at least one of the tongues to permit its flange or lip to escape through the slot or individual hole and so enable the flanges of the other tongues to be extracted.

In order that the invention may be clearly understood and readily carried into effect, a preferred embodiment of spring clip is hereinafter more fully described with reference to the accompanying drawings which are given for purposes of illustration only and not of limitation.

In these drawings—

Figure 1 shows how the clips may be cut from a strip of sheet metal,

Figure 2 shows the cut blank,

Figure 3 is a perspective view showing the completely fashioned clip, and

Figure 4 is a section through a supporting structure showing the clip in position of use with its tongues located in a slot therein.

Referring now to the said drawings, the spring clip 1 has at its one end three tongues 2, 3, 4 two of which namely the tongues 2, 4 are formed as continuations of the side surface and the third tongue 3 is formed at the mid point along that end. Flanges or lips are formed at the ends of the tongues of which those numbered $2^1$, $4^1$ on the ends of the two outer tongues 2, 4 extend in the same direction whilst that numbered $3^1$ on the middle tongue 3 extends in the opposite direction. The middle tongue 3 is bent to lie at an angle to the other tongues 2, 4 in the same direction as the direction in which its lip extends as may be clearly seen from Figure 3. At the opposite end of the clip the side surfaces as at 5, 7 are cut back and a recess 6 is formed at the mid point along the edge of that end. The web of the clip is rolled round into tubular form when the tongues 2, 3, 4 enter the cut back or recessed portions 5, 6, 7 respectively.

In use, a conduit, cable or the like 8 is threaded through the clip 1 and the lips $2^1$, $4^1$ on the two outer tongues 2, 4 engaged in suitable holes in the structure 9, whereafter the middle tongue 3 is flexed to enable its lip $3^1$ to enter a third hole in alignment with the holes engaged by the two outer tongues and lock by engaging the opposite surface of the structure 9. To permit the lips $2^1$, $3^1$, $4^1$ to pass through to engage the opposite surface of the structure 9 in which the holes are provided, the opposite recessed end of the device is flexed and tensioned. The tendency for the centre tongue 3 to move in a direction away from the two outer tongues 2, 4 ensures that the lips will engage the opposite surface of the structure 9 clear of the holes whilst the flexing of the opposite recessed end of the clip 1 ensures that the lips will be held tight against that surface. Therefore, the clip will not separate from the securing holes due to tugging, jerking, vibration and suchlike effort. To remove the clip 1 it is only necessary to flex the middle tongue 3 to disengage its lip and permit it to escape through the securing hole whereafter the clip may be rocked and the other two tongues separated 2, 4 from their holes. The tongues 2, 3, 4 may equally well extend through a slot 10 in the structure 9, as illustrated in Figure 4 for clarity as showing both the tongues 3, 4 and the engagement of their lips $3^1$, $4^1$.

The clip will naturally be made of spring steel and after shaping, tempered to the necessary degree of resilience. The clip may be formed from strip steel by a single blanking tool as the shape of the cut-back portions or recesses 5, 6, 7 in the one end are opposite to the tongues 2, 3, 4 formed at the other end as is clearly shown in Figure 1. Therefore, when making the device from steel strip, the cutting out of the tongues of one device form the cut-back portions or recesses in the next device. The clip is, therefore, not only simple to use and efficient in use, but is easy and cheap to make.

I claim:

1. A spring fastener for attaching wires, cables, pipes and similar elongated elements to a flat supporting member, such as a wall plate, provided with a cut-out having two substantially parallel opposite edges, said fastener comprising a strip adapted to be applied to a flat surface and of spring metal having at one end a portion provided with a number of parallel elongated recesses and at its other end, a corresponding number of tongues with hook-shaped ends, the body portion of said strip between said ends forming a loop to surround the element to be attached to the supporting member with said tongues projecting through said recesses, at least one of said tongues extending through the corresponding recess near the outer end thereof and having its hook-shaped end pointing in the general direction towards the outer end of said recess and at least one other tongue extending through the corresponding recess near the inner end thereof at an angle to said first mentioned tongue and having its hook-shaped end pointing in the general direction toward the inner end of the recess, whereby the opposite hook-shaped ends of said tongues can be engaged behind the opposite substantially parallel edges of the cut-out in the supporting member when said end portion of the fastener strip provided with said recesses is applied to the flat surface of the supporting member.

2. A spring fastener for attaching wires, cables, pipes and similar elongated elements to a flat supporting member, such as a wall plate, provided with a cut-out having two substantially parallel opposite edges, said fastener comprising a strip of spring metal having at one end a portion adapted to be applied to a flat surface and provided with three parallel elongated recesses and at its other end, three tongues with hook-shaped ends, the body portion of said strip between said ends forming a loop to surround the element to be attached to the supporting member with the two outer tongues projecting through the corresponding recesses in a common plane and the center tongue projecting through the corresponding recess in a plane disposed at an angle to the plane in which said outer tongues are located, the hook-shaped ends of said two outer tongues pointing in the general direction away from the plane in which said center tongue is located and the hook-shaped end of said center tongue pointing in the general direction away from the plane in which said two outer tongues are located, whereby the oppositely pointing hook-shaped ends of said tongues can be engaged behind the opposite substantially parallel edges of the cut-out in the supporting member when said end portion of the fastener strip provided with said recesses is applied to the flat surface of the supporting member.

ERIC VINCENT HALL.

REFERENCES CITED

The following references are of record in the file of this patent:

UNITED STATES PATENTS

| Number | Name | Date |
|---|---|---|
| 1,622,632 | Fahnestock | Mar. 29, 1927 |
| 1,585,840 | Fahnestock | May 25, 1926 |